US008071218B2

(12) United States Patent
Kapkin

(10) Patent No.: US 8,071,218 B2
(45) Date of Patent: Dec. 6, 2011

(54) LAYERED GLASS TILE

(76) Inventor: Koray Kapkin, Istanbul (TR)

(*) Notice: Subject to any disclaimer, the term of this patent is extended or adjusted under 35 U.S.C. 154(b) by 1015 days.

(21) Appl. No.: 10/490,449

(22) PCT Filed: May 14, 2002

(86) PCT No.: PCT/TR02/00019
§ 371 (c)(1),
(2), (4) Date: Mar. 24, 2004

(87) PCT Pub. No.: WO03/026904
PCT Pub. Date: Apr. 3, 2003

(65) Prior Publication Data

US 2004/0252378 A1 Dec. 16, 2004

(30) Foreign Application Priority Data

Sep. 24, 2001 (TR) ............................ A 2001 02665

(51) Int. Cl.
*B32B 17/06* (2006.01)

(52) U.S. Cl. ....... 428/426; 428/195.1; 428/49; 428/204; 359/619; 359/620; 235/462.01; 156/100; 52/204.59

(58) Field of Classification Search ............... 428/195.1, 428/49, 204; 156/100; 52/204.59; 235/462.01; 359/619, 620
See application file for complete search history.

(56) References Cited

U.S. PATENT DOCUMENTS

| | | | | | |
|---|---|---|---|---|---|
| 3,908,056 | A | * | 9/1975 | Anderson | 428/142 |
| 4,679,918 | A | * | 7/1987 | Ace | 351/163 |
| 5,924,870 | A | * | 7/1999 | Brosh et al. | 434/365 |
| 5,997,672 | A | * | 12/1999 | Barr | 156/100 |
| 6,141,073 | A | * | 10/2000 | Sasaki et al. | 349/122 |
| 6,251,566 | B1 | * | 6/2001 | Brosh et al. | 430/321 |
| 6,329,987 | B1 | * | 12/2001 | Gottfried et al. | 345/419 |
| 6,413,618 | B1 | * | 7/2002 | Parker et al. | 428/195.1 |
| 6,900,944 | B2 | * | 5/2005 | Tomczyk | 359/619 |
| 6,961,185 | B2 | * | 11/2005 | Suehiro et al. | 359/620 |
| 6,974,080 | B1 | * | 12/2005 | Goggins | 235/462.01 |
| 2002/0085287 | A1 | * | 7/2002 | Egawa | 359/619 |

* cited by examiner

*Primary Examiner* — Mark Ruthkosky
*Assistant Examiner* — Tamra L Amakwe
(74) *Attorney, Agent, or Firm* — Arent Fox, LLP

(57) ABSTRACT

This invention is thought as a material for decoration and construction. It can be used in wet areas, walls, floors, and all surfaces. Changing appearance glass tile (8) is made up of colored, non colored, transparent, translucent, or any type, any size, shape, form and thickness of glass (6) laminated with the use of an adhesive material (7) to a lenticular image (5) which is made up of more than one image (1) divided into dozens of strips per cm with the use of special computer programs (2) and are interlaced in to one image (3) which is then printed behind a lenticular film (4) which is a semi cylindrical formed, precisely specified dimensioned, ribbed transparent plastic which allows the viewer to see one image at a time according to the observation angle or printed on a graphic film and then laminated to lenticular film (4).

8 Claims, 2 Drawing Sheets

LAYERED GLASS TILE

CROSS-REFERENCE TO RELATED APPLICATION

This application is a National Stage entry of International Application No. PCT/TR02/00019, having an international filing date of May 14, 2002 and claiming priority to Turkish Application No. 2001/02665, filed Sep. 24, 2001, the disclosure of each of which is hereby incorporated in their entirety by reference.

FIELD OF THE INVENTION

The present invention relates generally to glass tiling materials used as surface covering in decoration and construction field. Stated more particularly, the present invention is about achieving a glass tiling material which has changing appearances according to the viewers observation angle achieved by uniting glass and lenticular image.

BACKGROUND OF THE INVENTION

For many years, natural and artificial construction materials have been used for tiling interior and exterior faces of buildings. Marble, granite, and ceramic tiles of various kind are the most often used surface covering materials. In addition to being decorative, surface covering material used should be functional, exhibiting the following characteristics: long durability, resistance to weather effects, resistance to corrosion, inert behavior to chemicals, hygiene, thermal insulation properties, resistance to abrasion, and at the same time it should also be economical in both production and installation costs. It is known that no natural or artificial material meets all the aforementioned requirements.

Additionally all known artificial and natural covering materials has fixed images. Even presently fabricated glass tiles have fixed images and pictures. Glass tiles as stated in U.S. Pat. No. 1,454,842 has been known since 1923's. This material has changed in years and glass tiling material technique has been developed in years as the following example patents:

| | | |
|---|---|---|
| CN Pat. No. 1,090,006 | 07, 1994 | Glass tile for decoration and production thereof |
| U.S. Pat. No. 5,792,524 | 08, 1998 | Decorative construction material |
| U.S. Pat. No. 5,997,672 | 12, 1999 | Glass photo tile |
| DE Pat. No. 19813711 | 09, 1999 | Glass tile with a durably attached decorative pattern |
| U.S. Pat. No. 6,042,905 | 03, 2000 | Decorative construction material and methods of its production |
| GB Pat. No. 2349362 | 11, 2000 | Decorative glass tile with slumped edges and painted rear surface |

Covering materials that are composed of glass with graphic or photographic images are the techniques known state. The difference between this invention and existing glass tiles is achieved by uniting glass with a lenticular image. Lenticular image technique has been known since 1940's which enables changing appearances according to the viewers observation angle. Lenticular image technique has been explained in U.S. Pat. No. RE35029 dated August 1995. Some patents for the lenticular image technique are as follows:

| | | |
|---|---|---|
| U.S. Pat. No. 2,815,310 | 12, 1957 | Process of assembling in the art of changeable picture display devices |
| U.S. Pat. No. 5,276,478 | 01, 1994 | Method and apparatus for optimizing depth images by adjusting print spacing |
| U.S. Pat. No. 5,924,870 | 07, 1999 | Lenticular image and method |
| U.S. Pat. No. 6,115,101 | 09, 2000 | Method and apparatus for producing three-dimensional images with motion |
| U.S. Pat. No. 6,211,896 | 04, 2001 | Method for producing lenticular images |
| U.S. Pat. No. 6,252,621 | 06, 2001 | Printing lenticular images |

According to the techniques known state, lenticular image techniques has developed in time. As a result, along with different printing techniques, different image effects have been developed. The current effects which are still being developed can be described as follows:

a) Flip: The quick transition between two or more distinct graphical elements depending on the viewers observation angle.
b) Motion: As the viewing angle changes, rotation of an image on an axis or achieving a motion in one or multiple directions.
c) Morph: As the viewing angle changes, a fluid transition between one graphical element to another graphic element, usually of like size and shape.
d) Zoom: As the viewing angle changes, image moves front to back gaining or decreasing in size.
e) Animation: As the viewing angle changes, usage of about 50 frames from a video to form a small video clip.
f) 3D: Without the need of change in the viewing angle, the optical illusion of depth and distance between elements from the foreground to the background.

Glass as a material, in relation to other natural and artificial covering materials, is known to be resistant to weather effects, fading, and to chemicals. Characteristics of the glass material used in changing appearance glass tile is as stated below:

| Standard | Physical features | Required result for tiles | Result |
|---|---|---|---|
| EN 99 | Water absorption | Average ≦ 3, max for each 3.3 | 0.0% |
| EN 100 | Modulus of rupture | Minimum 27 MPa | 65.6 MPa |
| EN 104 | Thermal shock resistance | Resistant | Resistant |
| EN 105 | Cracking resistance | Resistant | Resistant |
| EN 106,22 | Chemical resistance | Resistant | Resistant |
| EN 176 | Size allowance | ±0.5% | ±0.1% |
| EN 202 | Frost Resistance | Min. 50 cycles at −15° C./+15° C. | Resistant |
| ISO 7991 | Thermal lin. expansion coefficient (20-300° C.) | Max $9.10^{-6}\ K^{-1}$ | $8.61 \cdot 10^{-6}\ K^{-1}$ |
| IP F-11-95 | Sudden temperature variation resistance | Resistant | Resistant |
| IZP-01 | Light resistance determination | No changes | No changes |

Along with the advantages of glass material, by using the effects brought by lenticular imaging technique, changing appearance glass tiling material is bringing new dimension to the decoration and construction field. With this invention theme environments can be achieved more realistically and effectively. In relation to regular tiles, changing appearance glass tiles will bring constant variation and differentiating living spaces to its environment through the use of different color, design, graphic and image effects. For example, instead of ceramic tiles which has fixed designs, with the use of this invention on the wall tiles by using motion effect, swimming fish in a wavy sea and on the floor tiles by depth effect, shimmering of underwater world can be achieved. A decorative construction material is disclosed in document EP-A-0425670.

BRIEF DESCRIPTION OF THE DRAWINGS

Changing appearance glass tile is described in detail in reference to the attached drawings. These drawings are.

Figure 1:
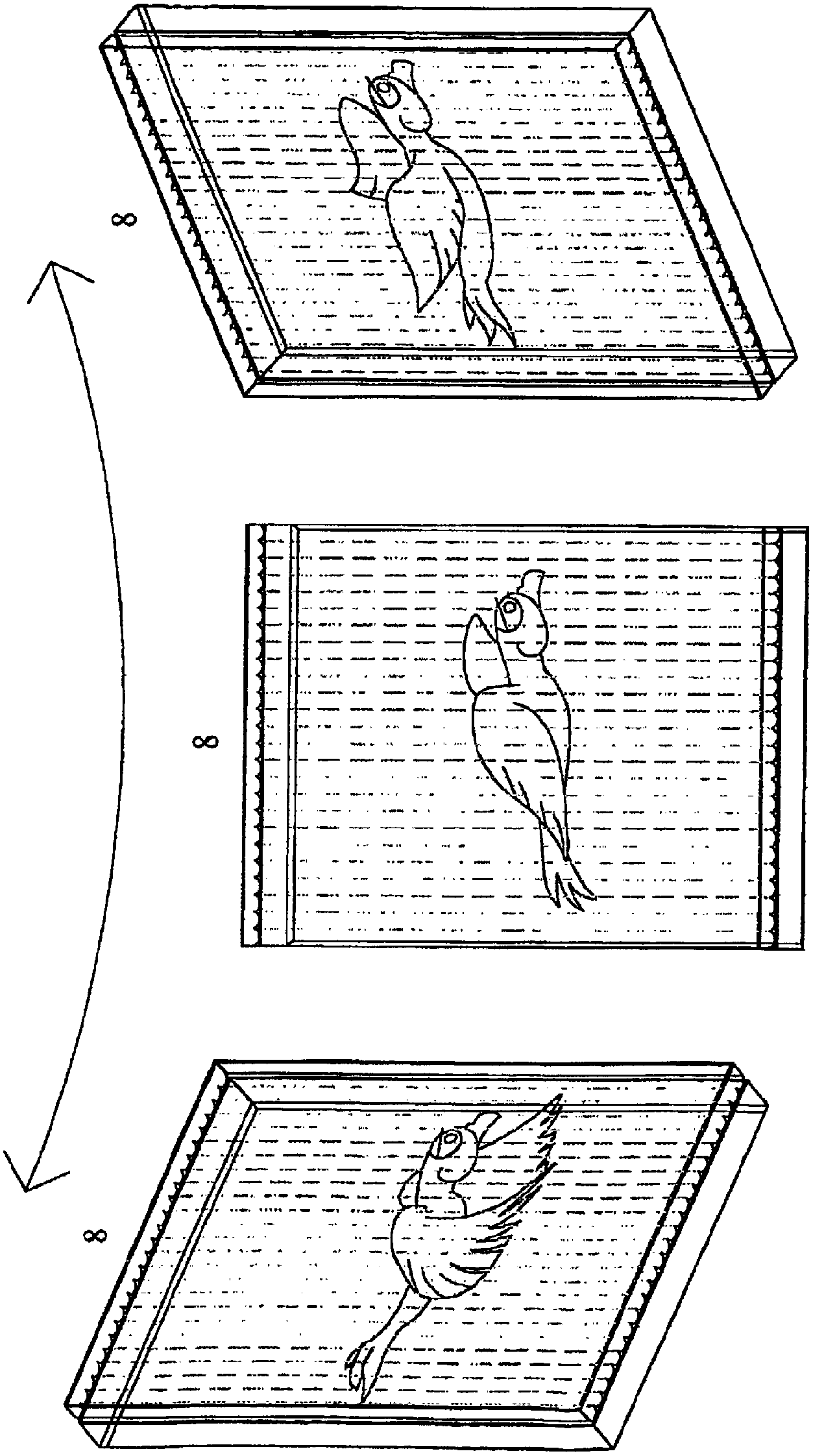
FIG. 1, description of the changing appearances according to the observation angle of the final invention.
Figure 2:
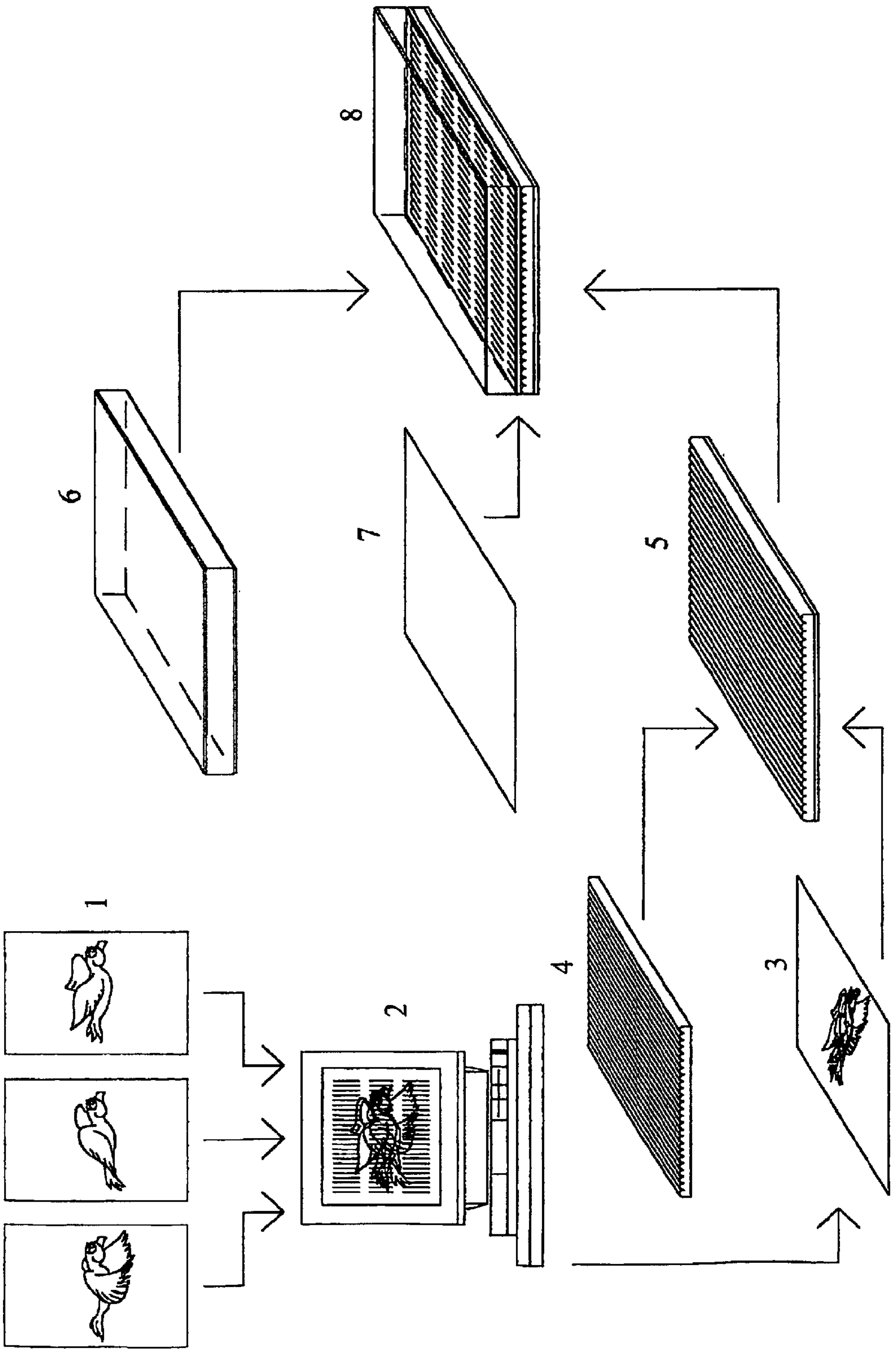
FIG. 2, description of the formation steps of the invention.

(1) More than one image
(2) Computer program
(3) Interlaced one image
(4) Lenticular film
(5) Lenticular image
(6) Glass
(7) Adhesive material
(8) Changing appearance glass tile

DETAILED DESCRIPTION OF THE INVENTION

Changing appearance glass tile (8) is made up of three parts:

a) Colored, non-colored, transparent, translucent, or all kinds of different size, shape, form, and thickness of glass (6)
b) Lenticular image (5)
c) Adhesive material (7)

Colored, non colored, transparent, translucent or any type, any size, form, and thickness of glass (6) can be used in this invention. By general meaning, glass is any of a large class of materials with highly variable mechanical and optical properties that solidify from the molten state without crystallization, that are typically based on silicon dioxide, boric oxide, aluminum oxide, or phosphorus pentoxide, that are generally transparent or translucent. Recommended material for this invention is "float glass". Float glass production is based on "floating" the molten glass on molten tin. This process allows the glass surface to be perfectly parallel and completely free from surface defects. Manufacturing of float glass is preferably should be according to the Turkish Standards 10288. Tinted float products are manufactured by adding coloring agents to the raw batch before the melting process. Float glass, weather colored or not, could be used by cutting, bending, sanding, laminating. Preferably in this invention, glasses with 5 mm and 8 mm thickness are to be used and preferably after being cut in ceramic tile sizes, the edges are to be flat grinded.

Lenticular image (5), is made up of four phases according to the technologies current status. More than one image (1) is divided into dozens of parallel strips per cm with the use of special computer programs (2) and are interlaced in to one picture (3) so very thin strip of each image is printed next to a strip from the next which only makes sense if it is looked trough a lenticular film (4).

Lenticular film (4) is a semi cylindrical formed, precisely specified dimensioned, ribbed transparent plastic which allows the observer to see one image at a time. In general, materials for production of lenticular films (4) are vinyl, acrylic, and Eastman Chemical's Eastar PETG co-polyester. Lenticular film (4) has different thickness and also has a different visual effect in relation to the amount of lenticules per cm.

An interlaced image (3) with special computer programs (2), is either printed behind a lenticular film (4) or printed on a graphic film and then laminated to a lenticular film (4). Since lenticular film (4) has a ribbed finish, it allows only portions of the background to be seen, which allows the interlaced image (3) made up of two or more images (1) to be seen one at a time as the observation angle changes. This lenticular image (5) is than attached to a glass (6) with the help of an adhesive material (7). For this adhesion, film adhesives are preferred. Depending to the film adhesives characteristics, according to the invention optically clear ones are to be placed in between lenticular image (5) and glass (6), others preferably are to be placed underneath the lenticular image (5) which is underneath the glass (6) holding the glass from the sides.

Changing appearance glass titles can be manufactured in any form and in any standard sizes or custom sizes which can be installed by any experienced tile installer.

Application of changing appearance glass tile:

a) Equipment: Ceramic cutting machine equipped with a diamond cutter, scrubbing brush, drilling machine with a diamond bit, try square, grind stone, tungsten carbide hand saw, pliers, penetration coating, cement based adhesives, silicon based adhesives, regular jointing material, water cooling system, craft knife, safety goggles, diamond surface steel wire saw, spreader, and trowel.
b) Base preparation: Base must be solid and dry, without cracks and unevenness. It must also be clean and free from elements which impairs adhesion.
c) Penetration coating: For highly absorbent bases like gypsum walls, suitable penetration coating is recommended.
d) Hand cutting glass tiles: A diamond hand-cutter can be used for drawing any shape and length to be cut. Separation is then achieved by knocking the cut from behind. A craft knife is used for cutting lenticular image in any shape.
e) Machine cutting glass tiles: A ceramic cutting machine equipped with diamond cutter and water cooling system is recommended for easy cutting. When cutting off a corner sector, drilling a hole in the top of a corner sector first is recommended which will prevent the tile from breakage. Irregular shapes can be cut off with a saw which has a diamond surface steel wire. Lenticular image can be separated from the pieces easily with a craft knife. A combination of hand and machine cutting is also suitable.
f) Edge grinding: Hand grinding; use grinding stone for glass soaked in water.
g) Edge grinding for professionals: If multiple quantity of tiles need to be grinded, machine grinding can be used; different types of grinding wheels are used for this purpose.
h) Hole drilling: Always use a water cooling system when drilling. Rough-drilling on the back of the tile with a diamond bit drill for cutting glass will avoid any chipped edges when finishing the drilling from the front side.
i) Hole drilling on a fixed glass tile: With a drilling machine, a diamond bit drill for cutting glass is used.
j) Using a saw: For cutting large holes and different shapes tungsten carbide handsaws are recommended.
k) Fixing: When applying adhesives application onto the base, a spreader with 3-4 mm teeth is used.

Adhesive has to be spread equally all over the back of the tile. Absorbent base—we recommend cement based adhesives with flexible additives. Non—absorbent base—silicon based or two component adhesives.

l) Application: Application of glass tiles on vertical surfaces is started from the bottom. For achieving an even surface pressure is applied for adhesion.

m) Jointing: Commonly used jointing materials is used with a trowel after the application is dry according to the manufacturers recommendations. For achieving an even surface pressure is applied for adhesion and left to dry according to the jointing material manufacturers recommendations.

n) Cleaning: After the joints are dry, a wet sponge is use for cleaning the surface. The overflowing materials can be cleaned with regular cleaning liquids.

In light of the basic physical characteristics of the changing appearance glass tiles, the following uses suggest potential markets:

Bathrooms: Showers, tub areas, walls, floors, counters

Kitchens: Walls, floors, counters

Ceiling, floor, wall decorations

Murals of any dimension

Signage: Airports, subways, public areas

Logos: Size flexibility, weather resistant

Swimming Pools

Decorative tiling of nurseries

Souvenirs

Commercial & Mass Market

The versatility of the new concept product suggests direct marketing to the following potential users:

Architecture Companies

Construction Companies

Developers

Airports

Theme Parks

Hotels

Entertainment facilities like bars and discos

Business headquarters

Shopping malls

Hospitals

Libraries

Restaurants

I claim:

1. A layered glass tile (8) with appearances that change according to a viewer's observation angle, the layered glass tile comprising:

a first layer (6), which is a glass plate having upper and lower planar faces;

a second layer (5) located below the first layer and which includes a lenticular film (4) and a decorative lenticular image comprising a plurality of interlaced images (3) bonded with a smooth surface of the lenticular film (4), wherein an opposite surface of the lenticular film is ribbed, the ribbed surface of the lenticular film facing the first layer and including a plurality of ribs extending away therefrom; and a third layer (7) which binds the first layer to the lenticular image of the second layer.

2. The layered glass tile according to claim 1, wherein the glass plate (6) is transparent.

3. The layered glass tile according to claim 1, wherein the lenticular image (5) comprises at least two images (1) divided into a plurality of strips (2) interlaced into a single image (3), wherein a strip of each image is printed adjacent to a strip from another image and bonded with the lenticular film (4).

4. The layered glass tile according to claim 3, wherein the lenticular film (4) is a semi cylindrical formed ribbed transparent plastic.

5. The layered glass tile according to claim 1, wherein the lenticular image (5) is either printed on the lenticular film (4) or on a graphic film (3) and laminated on the lenticular film (4), wherein the change in appearance is obtained by a visual effect.

6. The construction material as set forth in layered glass tile according to claim 5, wherein the visual effect is at least one of flip, motion, morph, zoom, animation and 3D depth.

7. The layered glass tile according to claim 1, wherein the third layer (7) is an adhesive.

8. The layered glass tile according to claim 7, wherein the adhesive is optically clear.

* * * * *